Patented Jan. 6, 1925.

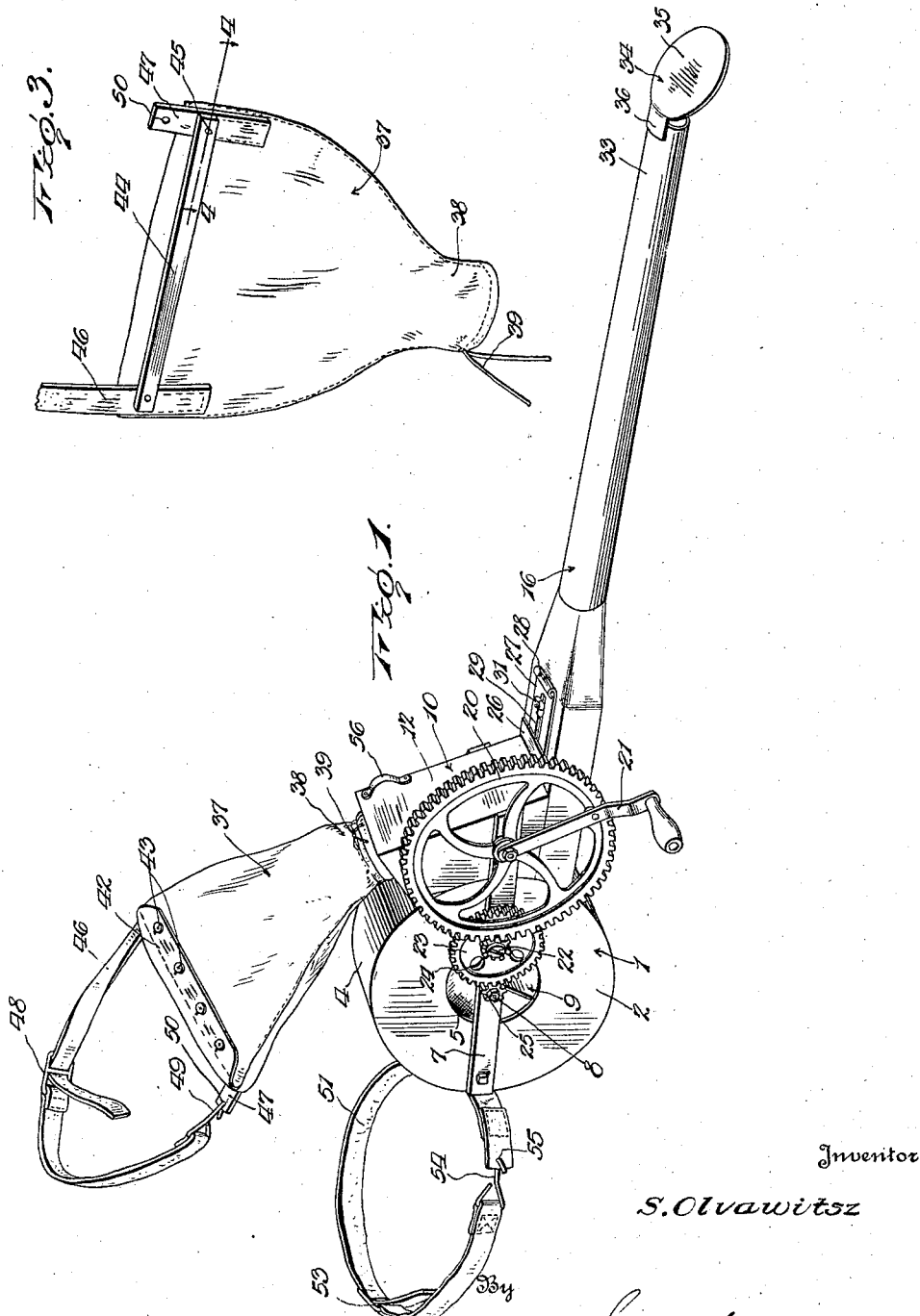

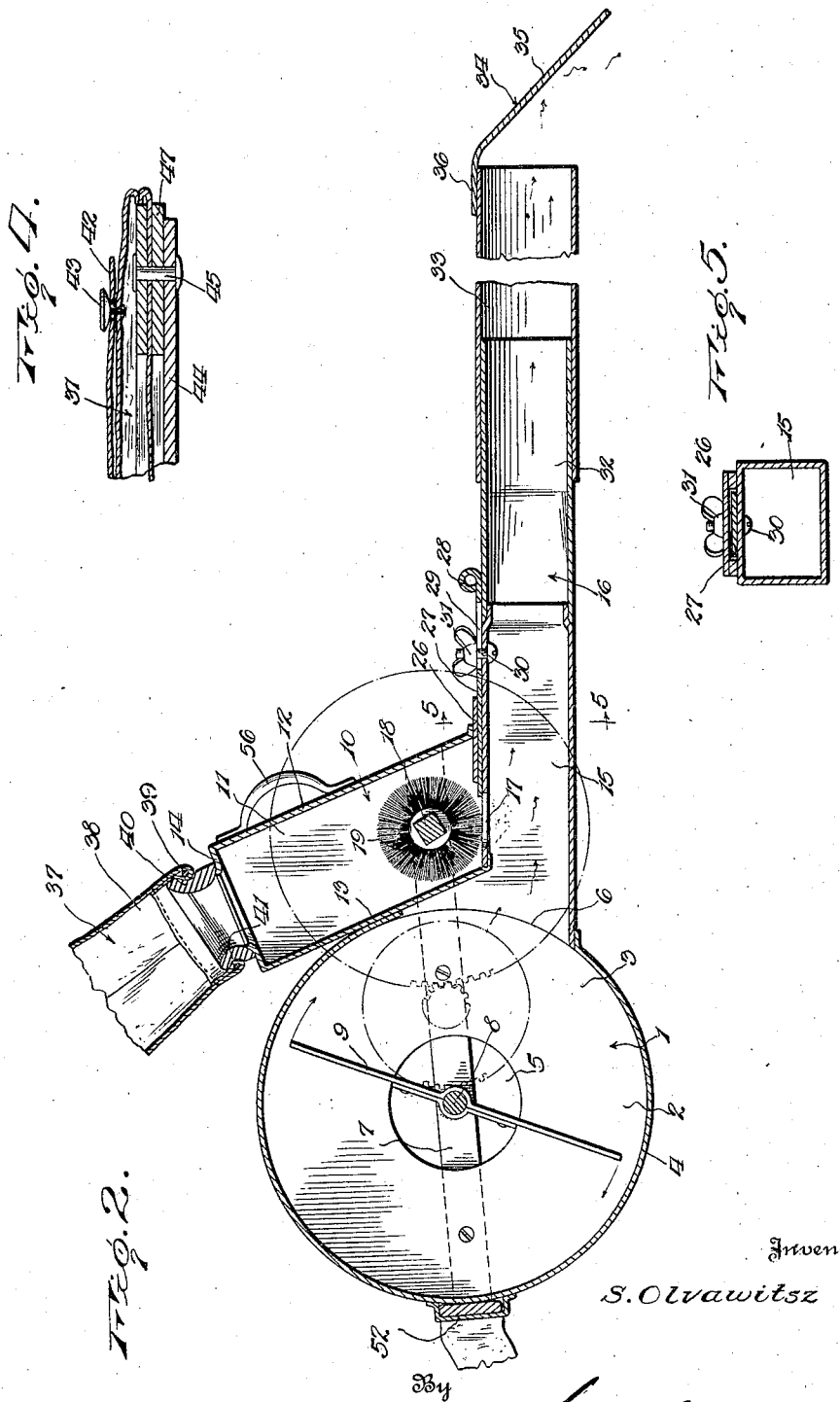

1,521,831

UNITED STATES PATENT OFFICE.

SEM OLVAWITSZ, OF SPRINGFIELD, TENNESSEE.

POWDER SPRAYER.

Application filed December 5, 1922. Serial No. 605,112.

*To all whom it may concern:*

Be it known that I, SEM OLVAWITSZ, a citizen of the United States, residing at Springfield, in the county of Robertson and State of Tennessee, have invented certain new and useful Improvements in Powder Sprayers, of which the following is a specification.

This invention relates to improvements in portable spraying machines for distributing powdered insecticide over infested plants.

One of the primary objects of the present invention is to provide a sprayer which in operation will deliver the powder to be distributed, in regulated quantities and which will break up or disintegrate any lumps in the powdered material before actual distribution.

Another important object of the invention is to provide novel means for directing the powdered material in a general downward direction and distributing the same over a relatively large area in an even manner so as to avoid waste and at the same time obtain the best results.

Another object of the invention is to provide means whereby the quantity of powdered material distributed may be regulated in accordance with the consistency of the material, that is to say in accordance with its fineness or coarseness, or the quantity regulated in accordance with the conditions under which the sprayer is employed.

Another object of the invention is to provide a novel form of container for the powdered material to be distributed, the container being constructed to contain a relatively large quantity of the powdered material and being at the same time light in weight and of such form that its presence will not prove burdensome to the user of the sprayer nor cause inconvenience in operating the sprayer.

Another object of the invention is to provide means whereby the sprayer may be supported upon the person of the user without causing inconvenience or annoyance and in a position to facilitate operation of the sprayer.

In the accompanying drawings:

Figure 1 is a perspective view of the sprayer embodying the invention;

Figure 2 is a vertical longitudinal sectional view through the sprayer;

Figure 3 is a perspective view of the container for the powdered material to be distributed;

Figure 4 is a detail sectional view taken substantially on the line 4—4 of Figure 3;

Figure 5 is a vertical transverse sectional view on the line 5—5 of Figure 2.

The sprayer embodying the invention includes a blower which is indicated in general by the numeral 1 and which comprises a cylindrical casing 2 having side walls 3 and a circumferential wall 4, the side walls 3 being provided centrally with openings 5, and the wall 4 being provided at the forward side of the casing with an opening 6. Bars 7 are secured upon the outer sides of the walls 3 of the blower casing and extending diametrically across the openings 5, and rotatably mounted adjacent its ends in suitable bearings provided in these bars, and extending transversely within the casing is a shaft 8 upon which are fixed fan blades 9.

The numeral 10 indicates in general a chute which is mounted upon the forward side of the blower casing 2 and comprises side walls 11, a front wall 12, a rear wall 13, and a top 14. The lower end of the chute 10 joins the top of the fixed inner section 15 of a delivery spout, which is indicated in general by the numeral 16, and the upper side of the said section 16 is formed with an opening 17 through which the powdered material may be delivered from the chute into the said section of the spout. Preferably the bars 7 extend forwardly beyond the blower casing 2 and at the opposite sides of the chute 10, and a shaft 18 is journaled at its ends through the side walls 11 of the chute and through the projecting ends of the said bars. A brush 19 is mounted upon the shaft 18 within the chute 10 with its lower side located directly above and preferably substantially within the opening 17.

A gear 20 is fixed upon the right hand end of the shaft 18 and has mounted upon it a crank handle 21 by means of which it and the shaft may be rotated. A stub shaft 22 is fixed upon the right hand one of the bars 7, and a gear 23 and pinion 24 are rotatably mounted upon the said shaft, being connected for rotation in unison. The gear 20 meshes with the pinion 24 and the gear 23 meshes with a pinion 25, which is fixed upon the corresponding end of the shaft 8. At this point it will be evident that rotation of the crank handle 21 will result in rotation of the brush 19 at a relatively slow rate of speed or, in other words, at the same rate in which the crank handle and its associated gear 20 are rotated, and that simultaneously the fan shaft 8 will be rotated at a much higher rate of speed due to the proportioning of the gear elements which transmit motion from the gear 20 to the said shaft 8. In this operation, powdered material within the chute 10 will be loosened by the rotating brush 19 and delivered in regulated quantity through the opening 17 into the spout 16 and will be blown through the spout by the blast of air delivered from the rotating blades 9 of the blower 1.

In order that the delivery of the powdered material through the opening 17 may be regulated, a guide plate 26 is arranged in spaced relation above the upper side of the fixed spout section 15 and beneath the lower end of the front wall 12 of the chute 10, and a valve plate 27 is slidably mounted within the space between said plate 26 and spout section 15, the inner end of the plate being presented at the opening 17 and adjustment of the plate serving to more or less restrict the area of this opening. In order that the valve plate may be readily adjusted, its forward end is preferably rolled or overturned to form a finger piece 28, and in order that the plate may be held in its positions of adjustment, it is formed with a slot 29 through which extends a bolt 30 which is fitted through the top wall of the spout section 15, a wing nut 31 being threaded onto the said bolt and being adapted to be tightened to bind against the valve plate.

The fixed section 15 of the spout 16 is provided with an extension 32 onto which is removably fitted another spout section indicated by the numeral 33, the removability of this latter section permitting of the sprayer being stored in a smaller space than would be required if the spout were of integral structure throughout. In order that the powdered material delivered from the spout may be deflected in a downward direction and widely scattered or spread, a deflector 34 is provided and comprises a plate 35 of circular or other suitable form having a shank portion 36 soldered or otherwise secured to the upper side of the delivery end of the spout section 33. The deflector plate 35 is inclined downwardly from its point of attachment to the spout section 33 and in advance of and opposite the said delivery end of the spout section so that the powdered material blown from the spout will strike against the downwardly presented or under side of the plate and, due to the inclination of the plate, will be not only directed in a general downward direction but also laterally to a greater or less extent.

The powdered material to be distributed by the sprayer is introduced into a container which is indicated in general by the numeral 37 and this container is preferably in the form of a pouch which may be made of heavy canvas of other suitable cloth material and is provided with a restricted mouth 38 equipped with a draw string or other closing means 39, the said mouth 38 being fitted over a neck 40 which extends upwardly from the top 14 of the chute 10 and which is provided exteriorly with a circumscribing groove or channel 41 in which the draw string receiving hem of the mouth 38 may be disposed, it being understood that when the draw string is tightened and tied the mouth of the pouch will be securely connected with the said neck 40. Preferably the pouch is increased in width in the direction of its top, and its said top is open so as to permit of the ready introduction of the powdered material to be distributed. However, the open top of the pouch is adapted to be closed by a flap 42 constituting an extension of the rear side or wall of the pouch and folded to overlap the upper portion of the forward wall or side of the pouch, buttons or other fastening elements 43 being employed for holding the flap closed. In order to impart rigidity to the upper portion of the pouch, a stay-bar 44 is disposed against the rear side of the top of the pouch and riveted or otherwise secured at its ends to the upper corners of the pouch, the rivets or other securing elements, which are indicated by the numeral 45, serving also to attach to the pouch one end of a neck strap 46 and also a short strap section 47. The neck strap 46 may be formed in two lengths or sections adjustably connected by a buckle 48, and the strap is provided at its free end with a hook 49 which is engageable in an opening 50 formed in the free end of the strap section 47, it being understood that the strap 46 is to be engaged about the neck or shoulders of the one operating the sprayer with the top of the pouch extending across the chest.

A body strap 51 is engaged through a bail 52 upon the rear side of the wall 4 of the blower casing 2 and may be made in sections connected by a buckle 53. The free end of the body belt 51 is provided with a hook 54 which is engageable in an opening 55 provided in the shorter end of said belt.

From the foregoing description of the invention it will be understood that the sprayer may be conveniently supported upon the person of the user in such position that it may be most readily operated, and that the blast of powdered material may be most effectually directed onto the plants. It will also be evident that while the pouch 37 is capable of containing a relatively large quantity of the material to be distributed, it will not prove cumbersome nor will it occasion inconvenience or hinder the user of the sprayer in his labors inasmuch as it is more or less flexible and is so supported as to distribute the weight of the material to the best advantage.

It will also be understood that the delivery of the powdered material may be controlled as desired and that any lumps in the material will be broken up by the rotating brush 19 before passing through the opening 17 into the discharge spout of the blower.

In order that the sprayer may be conveniently laterally swung or steadied, either as may be found desirable, while the crank handle is being turned, a handle 56 is preferably secured upon the forward side 12 of the chute 10.

Having thus described the invention, what is claimed as new is:

1. In a sprayer for powdered materials, a blower, a spout receiving the blast therefrom, a flexible pouch for containing the material arranged to discharge into the spout, a bar extending continuously between the upper corners of the pouch and maintaining the upper portion of the pouch in a stretched condition, and a body attachable suspension means associated with the said upper portion of the pouch and the ends of the bar.

2. In a sprayer for powdered materials, a blower, a spout receiving the blast therefrom, a flexible pouch for containing the material arranged to discharge into the spout, a bar extending between the upper corners of the pouch and maintaining the upper portion of the pouch in a stretched condition, a body strap connected with the blower, and a shoulder strap connected at its ends to the ends of said bar.

In testimony whereof I affix my signature.

SEM OLVAWITSZ. [L. S.]